United States Patent [19]

Burgdorf et al.

[11] Patent Number: 5,040,853
[45] Date of Patent: Aug. 20, 1991

[54] ELECTROHYDRAULIC PRESSURE CONTROL SYSTEM

[75] Inventors: Jochen Burgdorf, Offenbach-Rumpenheim; Hans-Dieter Reinartz, Frankfurt am Main; Peter Volz, Darmstadt; Arnim Vellmer, Frankfurt am Main, all of Fed. Rep. of Germany

[73] Assignee: Alfred Teves GmbH, Frankfurt am Main, Fed. Rep. of Germany

[21] Appl. No.: 445,600

[22] PCT Filed: Mar. 20, 1989

[86] PCT No.: PCT/EP89/00298
§ 371 Date: Dec. 19, 1989
§ 102(e) Date: Dec. 19, 1989

[87] PCT Pub. No.: WO89/10286
PCT Pub. Date: Nov. 2, 1989

[30] Foreign Application Priority Data

Apr. 20, 1988 [DE] Fed. Rep. of Germany ....... 3813138
Apr. 20, 1988 [DE] Fed. Rep. of Germany ....... 3813139

[51] Int. Cl.[5] ................................................ B60T 8/32
[52] U.S. Cl. .................................... 303/119; 303/113; 439/76
[58] Field of Search .................. 303/113, 119; 439/34, 439/76, 627

[56] References Cited

U.S. PATENT DOCUMENTS

| | | | |
|---|---|---|---|
| 4,409,641 | 10/1983 | Jakob et al. | 439/76 |
| 4,689,721 | 8/1987 | Damerow et al. | 439/76 X |
| 4,813,448 | 3/1989 | Leiber | 303/113 |
| 4,842,525 | 6/1989 | Galloway et al. | 303/119 |
| 4,929,038 | 5/1990 | Reinartz et al. | 303/113 X |

FOREIGN PATENT DOCUMENTS

| | | | |
|---|---|---|---|
| 0168286 | 1/1986 | European Pat. Off. | 303/119 |
| 3236535 | 4/1984 | Fed. Rep. of Germany . | |
| 3723106 | 1/1989 | Fed. Rep. of Germany . | |
| 3727330 | 2/1989 | Fed. Rep. of Germany . | |
| 3729216 | 3/1989 | Fed. Rep. of Germany . | |
| 3742320 | 6/1989 | Fed. Rep. of Germany | 303/119 |
| 3742830 | 7/1989 | Fed. Rep. of Germany | 303/119 |

Primary Examiner—Matthew C. Graham
Attorney, Agent, or Firm—Robert P. Seitter; J. Gordon Lewis

[57] ABSTRACT

An electrohydraulic pressure control means for use with an anti-locking control system is provided with an integral assembly comprising an electronic controller (1) and a hydraulic unit. The hydraulic unit includes of an element (18) for accommodating electromagnetic valves and a lid (13). The lid (13) encloses coils (5, 6) protruding beyond the valve-accommodating element. The controller (1) and the hydraulic unit are interconnected by a mounting, positioning and anchoring device (3) and by an electrical contact (4). The anchoring device (3) is located in the area of the valve-accommodating element (18). The electrical contact (4) is provided between the lid (13) and the electronic controller (1). The anchoring device (3) absorbs outer forces imparted to the controller (1). The contact (4) provides a shielded and safe electric contact. Moreover, a valve block assembly for use with an anti-locking control system is provided. The assembly includes a plurality of electromagnetic valves combined in block-type manner and located in the valve-accommodating member. The coils of the electromagnetic valves protrude beyond the valve-accommodating element. The coils are provided with contact elements. The valve block assembly includes a lid protecting the protruding coil portions and the contact elements. The lid is arranged as an electronic controller and forms an integral unit with the valve block assembly.

20 Claims, 6 Drawing Sheets

ELECTROHYDRAULIC PRESSURE CONTROL SYSTEM

The present invention relates to an electrohydraulic pressure control system and, more particularly, to a brake pressure control means, such as an anti-locking control system or a traction slip control system, comprising one or more electromagnetically actuable hydraulic valves (electromagnetic valves) located in block-type manner within a valve-receiving body. The system includes coils protruding beyond the valve-receiving body, with the coils, on the parts thereof protruding beyond the valve-receiving body, being provided with contact elements. The system further comprises a lid covering the protruding coil parts and the contact elements, a carrier element for conductors which is disposed within the lid, and comprising an electronic control means or controller.

Electrohydraulic pressure control means for anti-locking control systems and traction slip control systems are known in the art which include an electronic controller and a valve block. For example, German Patent Application P 37 23 106.5 teaches a brake pressure control means for anti-locking and traction slip control for use with automotive vehicles. This known brake system is provided with a master cylinder, a hydraulic booster for the master cylinder, a pressure fluid supply means consisting of a motor-driven pump and a pressure accumulator, a pressure modulator, consisting of electromagnetically actuable inlet and outlet valves for the wheel cylinders. These systems include sensors for detecting the wheel peripheral speed, an electronic controller for processing the sensor signals and for generating output signals for controlling the inlet and outlet valves. This type of brake pressure control system operates on a hydraulic booster disposed in coaxial relationship to the master cylinder. As another example, German Patent Application P 37 27 330.2 describes a brake pressure control system, in particular, an anti-locking control system, for a hydraulic brake system for use with automotive vehicles, comprising a vacuum brake force booster.

In known brake pressure control systems, hydraulic assemblies of the type as described in German Patent Application P 37 29 216.1 are employed. German Patent Application describes a hydraulic assembly for a hydraulic controller or regulator, especially for a brake pressure control means in anti-locking control systems or traction slip control systems for use with automotive vehicles. The system comprises at least one valve block including a group of electromagnetically switchable valves, and a connector part for additional components of the controller or regulator. According to that German Patent Application it is suggested that the pressure fluid inlets and outlets of the electromagnetically switchable valves which are switched-connected to pressure fluid inlets and outlets of the additional components of the controller or regulator, are located in the area of an external face of the valve block. The pressure fluid inlets and outlets of the additional controller or regulator are disposed in the area of an external face of the connector portion of the controller or regulator. At least one distributor element is provided which includes pressure fluid channels interconnecting switch-wise associated inlets and outlets of the valve block, and of the other components of the controller or regulator.

In these conventional systems, a separate arrangement of the valve block and of the electronic controller is provided which is disadvantageous. This construction and assembly of the all-over system in the automotive vehicle thereby is rendered complex and expensive, and further requiring extensive cable harness.

It is therefore an object of the present invention to provide an integral assembly unit comprising the hydraulic unit and the electronic controller. The cables and plug-connectors thereby are reduced. In combining the controller and the hydraulic unit to form an assembly, toward the end of providing a simplified manufacture, a balanced tolerance is to be provided between the components of the assembly. The cost of assembly incurred by mounting the anti-locking control system in the automotive vehicle are significantly reduced.

Moreover, the required assembly space for the anti-locking control system within the automotive vehicle is reduced. The method of establishing communication between the hydraulic unit and the electronic controller is simple and involves low costs.

It is a further object of the invention to provide advantageous structural conditions for mechanically assembling the two components to form an integral unit.

Integrating the hydraulic unit and the electronic controller is achieved through means of a connection which is resistant to mechanical stress, particularly tensile stress, and which provides a satisfactory electrical contact which is protected against environmental influences, such as moisture, heat, development of gas or mechanical stress. Moreover, also the conductors and electronic components are protected against environmental influences.

These and other problems are solved in that the lid or a part thereof, is arranged as an electronic controller or as a part of an electronic controller.

SUMMARY OF THE INVENTION

In developing the principle of the present invention, it is provided that in the area of the valve-accommodating body, a mounting, positioning and anchoring means mechanically loadable, especially by tensile stress is provided and which interconnects the electronic controller and the valve-accommodating body. An electrical contact means is provided in the lid area interconnecting electrical conduits for applying electric power to the coils, and the electronic controller.

To attain a good heat removal, a physical distance is provided permitting a heat discharge through a convection, between the electronic controller and the valve-receiving body and the lid. A protection against negative environmental influences is achieved in that a connecting piece for the electrical contact means is provided on the lid in which a sealant for receiving a contact element of the controller is provided.

According to another embodiment of the present invention the controller, in the area of the electrical contact means, is detachably secured to the lid, preferably by means of a resilient body. For simplifying the manufacture, the carrier element for the conductors, especially a conductor plate or conductor foil, is disposed in a mountable manner on the contact elements of the coils, especially on contact pins of the coils and on the contact element of the controller protruding through the lid. To facilitate assembly, especially with the aid of machines and to attain a balanced tolerance between the anchoring means and the electrical contact means and to ensure a sound sealing of the contact means the electrical contact means is arranged as a guiding, fixing and tolerance balancing element and provide it with a resilient guiding, fixing, tolerance-balancing and sealing member. According to another embodiment, an electrical clamping connecting is provided which consists of a spring contact element located on the conductor carrier, and a contact pin or contact blade disposed on the controller.

According to another form of embodiment a metal grid is provided on the conductor carrier, which grid forms the conductor (tracks) and is spray-coated by plastic material. According to another embodiment, the lid is made up of a frame and a plate fixed detachably, as by buttons or snap means, to the frame. Under certain conditions, it may be advantageous to establish the plug connection externally of the lid. To achieve this, the electrical contact means comprises a plug connection removable from the interior space below the lid. To attain a simplified assembly, the electrical contact means may include a clamping means fixed to the controller to establish, during assembly of the controller, a clamping connection with the conductor (track) carrier. According to another embodiment, a mounting platform for the lid is provided which is in flat abutment with the valve-accommodating body. Another mounting aid is provided in that at least one valve sleeve preferably of dome-shaped configuration is formed as the centering means for mounting the conductor carrier.

According to another embodiment, the lid or a part thereof is arranged as an electronic controller, with at least one carrier element for conductors and electronic components located in the vicinity of the front faces of the coils.

According to another embodiment at least one wall of an electronic controller is arranged as a lid of the valve block assembly. A particularly room-saving solution is attained in that at least one wall of the electronic controller is arranged as a lid of the valve block assembly and as a carrier element for conductors and electronic components. Moreover, provision is made for the lid to enclose at least one frame member on which at least one carrier element is disposed for conductors and electrical components. According to another embodiment a preferably frame-shaped adapter between the frame body and the valve-receiving body. A favorable hybrid circuit is attained in that an external plate preferably made of aluminum is located on the frame-shaped member, which external plate is arranged as a support for a carrier plate for conductors and electronic components, with the carrier plate being made of ceramics. An internal plate is provided which is arranged as a carrier plate to receive, in the interior and/or on the surface thereof, conductors and electronic components. Moreover, the frame-shaped body is of a height to protrude beyond the parts of the coils projecting beyond the valve-receiving member.

BRIEF DESCRIPTION OF THE DRAWING

Further details of the invention will become manifest from the following description of a plurality of embodiments. The various embodiments will be explained in greater detail with reference to the accompanying drawing, wherein.

DETAILED DESCRIPTION

Figure 1:
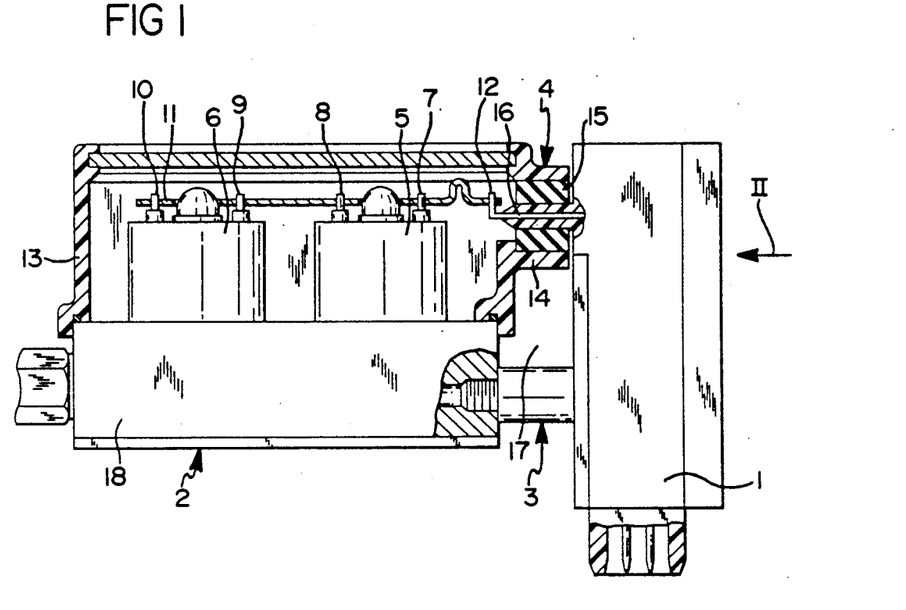
FIG. 1 shows an assembly comprising an electronic controller and a hydraulic unit.

Referring to the drawings, the electronic controller 1 and the hydraulic unit generally designated by numeral 2, in FIG. 1, are integrated to form an electrohydraulic pressure control means. The hydraulic unit is comprises a valve-receiving body 18 accommodating valves, coils and a lid. Reference numeral 3 generally designates a mounting, positioning and anchoring means. This includes a bolt interconnecting the valve-receiving member with the housing of the controller absorbing tensile loadings, if any, externally acting upon the controller. Numeral 4 generally designates the electrical contact means between the controller 1 and the hydraulic unit 2.

FIG. 1 illustrates the upper coil portions 5, 6 provided with contact pins 7, 8, 8, 10. Located on the contact pins is a conductor carrier 11 in communication with the contact pin 12 of the electronic controller. Housed in the conductor carrier are the conductors connecting the respective contact pins of the coils to the associated conductors of the controller. Provided on the lid 13 of the hydraulic unit protectively surrounding the upper parts of the coils and the contact pins and the conductor carrier, is a connecting piece 14 surrounding a sealant 15. Located in the sealant is the contact element 16 of the electronic controller. Provided between controller and hydraulic unit is an air gap 17 permitting a heat discharge through convection. The carrier element for the conductors may comprise a conductor plate or foil. The outgoing cable in the area of the electrical contact means may be formed of a plurality of contact blades forming a contact strip (a multiple contact plug).

The positioning means 3 performs the following functions to perform: accommodating of tensile stresses, positioning, facilitating of assembly, anchoring the controller within the valve-accommodating body. The functions of the electrical contact means are as follows: balancing of tolerances; insuring a satisfactory sealing of the electrical contact elements and establishing safe contacts.

Figure 2:
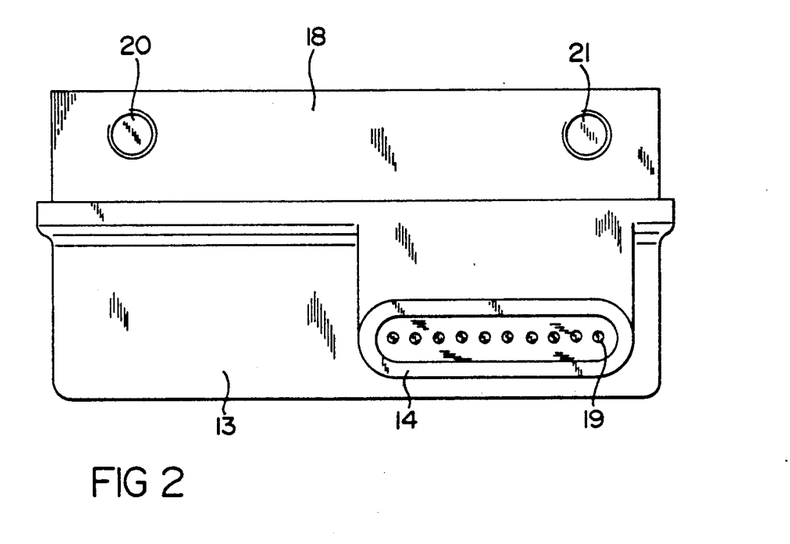
FIG. 2 shows, in enlarged scale, a view in the direction of arrow II of FIG. 1 without the electronic controller.

FIG. 2 shows, in enlarged scale, the view in the direction of arrow II of FIG. 1, with the controller omitted for clarity. FIG. 2 shows the valve-accommodating body 18, also illustrated in FIG. 1, along with the lid 13 and the connecting piece 14 of an elongated design. Entered into the connecting piece are the positions for the points of contact of the electrical contact means. One position is indicated with reference numeral 19. The connecting piece 14 thus surrounds a multiple plug means.

Designated by numerals 20, 21 are two positions for screw-type connections embodying the previously described mounting, positioning and anchoring means. The tensile stresses imparted to the controller are absorbed by these two means.

Figure 3:
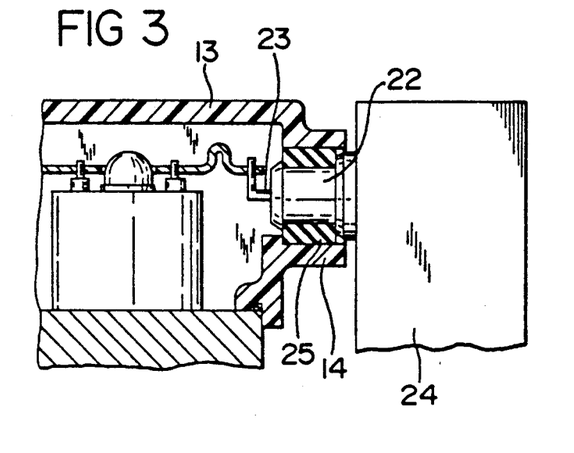
FIG. 3 shows an embodiment of the electrical contact means.
Figure 4:
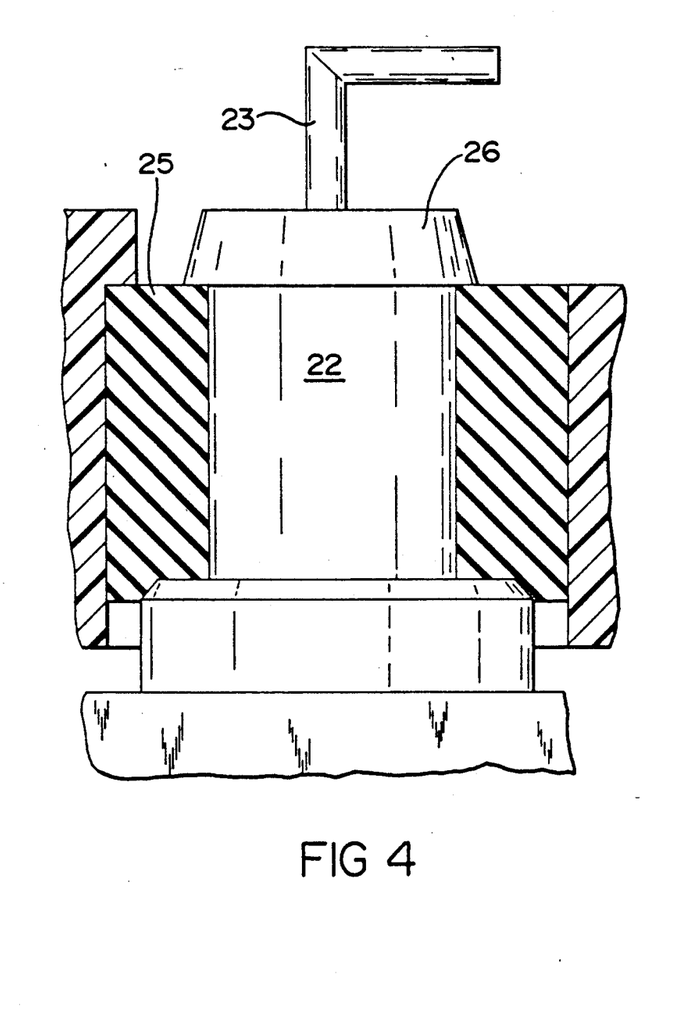
FIG. 4 shows a detail of FIG. 3 in enlarged scale.

FIG. 3 more clearly illustrates that the housing 24 of the electronic controller is provided with a step 22 accommodating a contact pin 23. Disposed between step 22 and connecting piece 14 is the sealant 25. As disclosed in FIG. 4, the step 22 comprises a broadened top end 26. The controller along with the step is thus detachably fixed within the lid 13. The contact pin 23, in FIGS. 3 and 4, is illustrated at an angle. Referring again to FIG. 1 it will be appreciated that the contact pins 7, 8, 9, 10 of the coils and the contact pin 23 on the step 22 of the controller point into the same direction. The carrier element 11 for the conductor tracks (conductor plates or foils) may be mounted in substantially one operation on the contact elements of the coils and of the controller.

Figure 5:
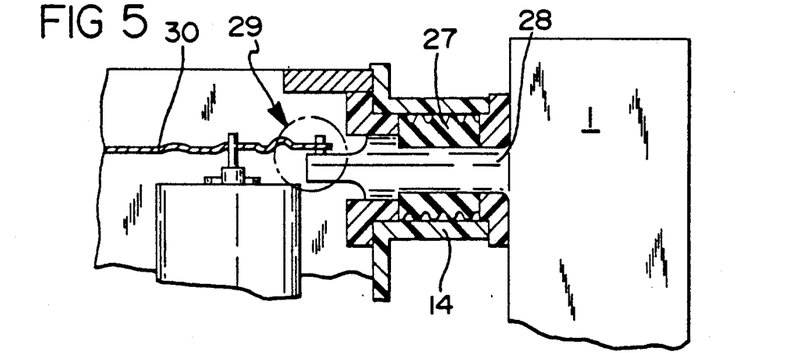
FIGS. 5 to 12 illustrate various embodiment of the electrical contact means.

According to the embodiment of FIG. 5, a sealing of the contact means, while at the same time permitting a balance of tolerance, is attainable. The sealant, for that purpose, is provided with flexible lips 27 conforming to the inner wall of the connecting piece 14. The step 28 on controller 1 accommodates the electrical conduits which, in the area 29, are connected to the conductors of the carrier foil 30.

Figure 6:
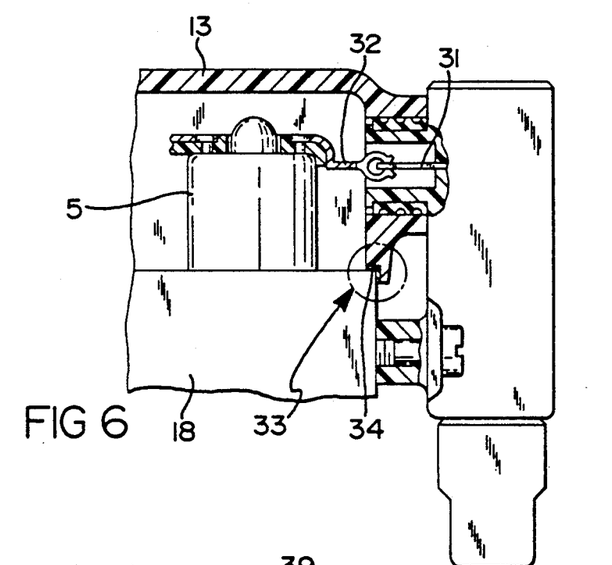

FIG. 6 shows a contact blade 31 straddled by a spring contact element 32. By arranging a plurality of contact blades in side-by-side relationship a plug assembly is formed. The conductor track carrier consists of a metal grid coated, by spraying, with plastic material and plugged onto the connecting pins of the coils. Alternatively, the metal grid may be soldered, welded, crimped or squeezed thereon. In the area 33, a sealant 34 is located between lid 13 and valve-accommodating body 18. The sealant may be inserted therein. printed or sprayed thereon.

Figure 7:
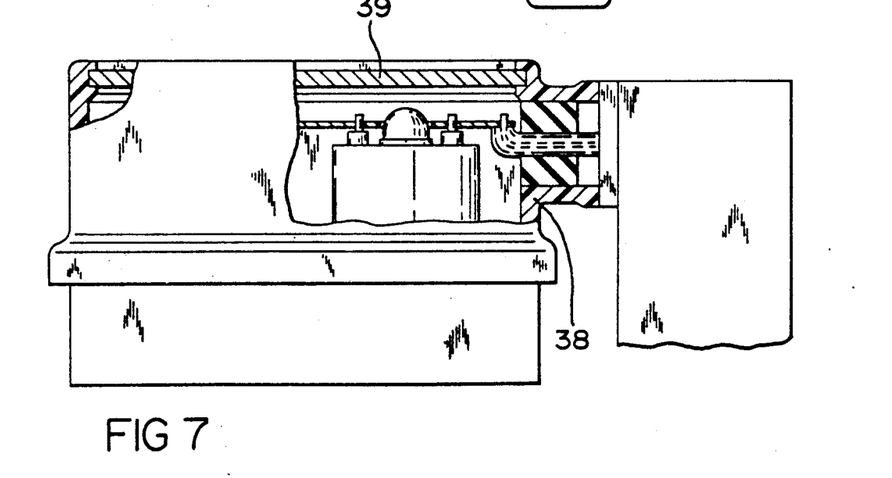

In the embodiment according to FIG. 7, the conductor track carrier is plugged onto the contact pins of the coils and onto the contact pin of the step on the controller. Assembly, inspection or repair work in the area of the conductor track carrier, in the embodiment according to FIG. 7 is particularly facilitated in that the lid is made of a frame portion 38 and a detachably fixed plate 39 is snapped in the frame. Hence, a snap fit is provided between the frame and the detachably fixed plate.

Figure 8:
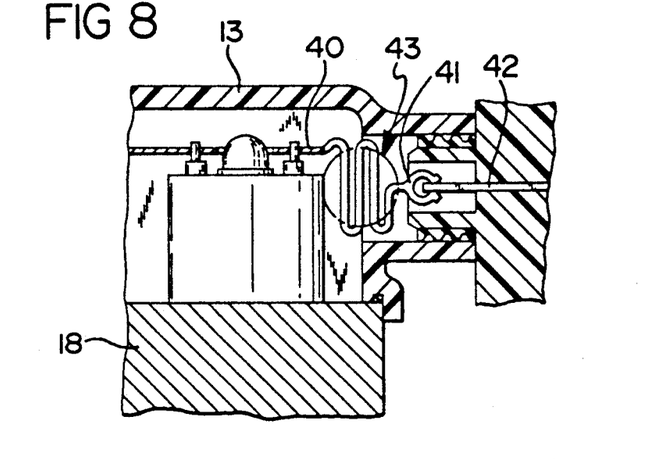

According to the embodiment of FIG. 8, the conductor track carrier 40, in the area of the electrical contact means, is flexibly arranged, for example in the form of a foil or cable. The plug connection between the controller and the hydraulic unit consists of a spring contact element 41 and a contact blade 42 provided on the controller. The connection composed of contact element and blade can be removed for assembly into and disassembly from the housing formed of a valve-accommodating body 18 and lid 13. As illustrated in FIG. 8, for this purpose, a meander-type arrangement of the conductor track carrier in assembled condition is provided in the area 43.

Figure 9:
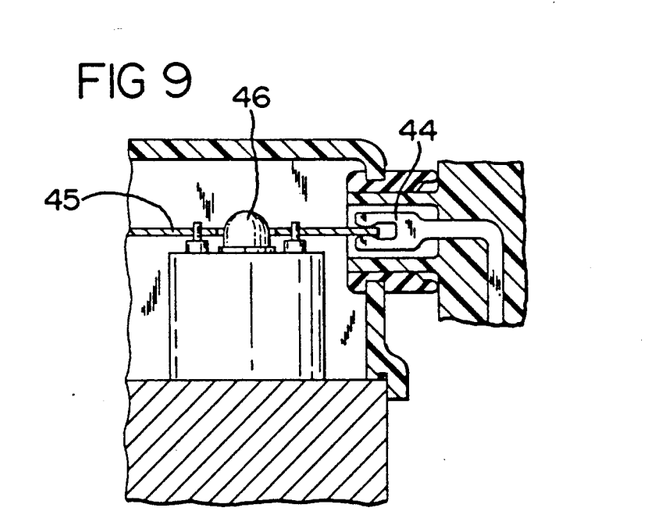

In the embodiment according to FIG. 9, a clamping means 44 is provided on the controller to establish, during assembly of the controller on the hydraulic unit, a clamp connection with the conductor track carrier 45. The sleeve 46 surrounding the mechanical parts of the electromagnet is of dome-shaped configuration. The dome-shaped configuration is used as a centering means during mounting of the conductor track carrier 45. The conductor track carriers and the conductor tracks can be produced by lamination. The conductor tracks, in an alternative configuration, can be made of a punched grid spray-coated with plastic material. Also, provision can be made wherein the conductor tracks are printed a plastic carrier element.

Figure 10:
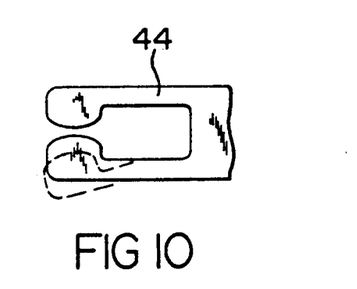

FIG. 10 shows a particular design of the spring contact element 44 of the controller. The expanded position of the spring contact element 44 is shown in broken lines while the initial position thereof is shown in solid lines.

Figure 11:
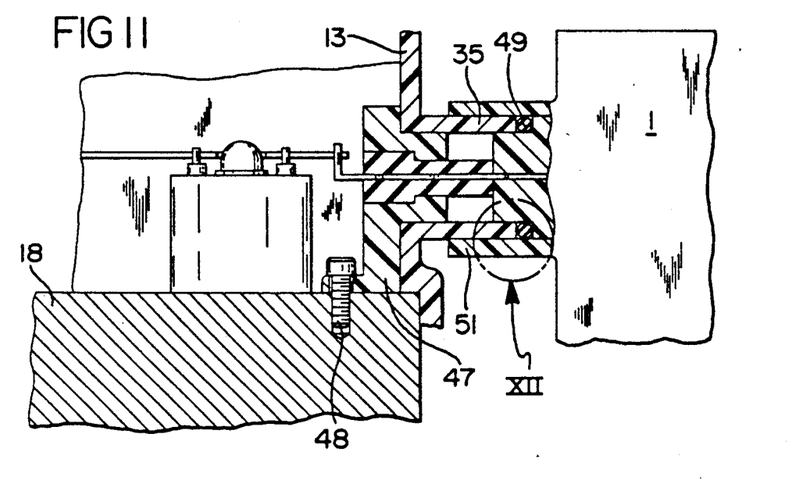
Figure 12:
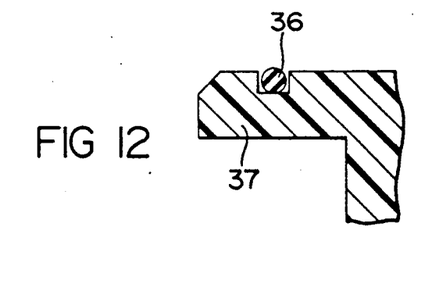

FIG. 11 illustrates a mounting platform 47 screwed to the valve-accommodating body, such as the schematically shown screw connection 48. The platform is in flat abutment with the valve-accommodating body 18, while the abutment thereof on the valve lid 13 is illustrated. The sealing between the connecting piece 51 of the controller 1 and the lid 13 may be effected by a sealant 49 axially disposed with respect to the connecting piece 35 of the lid. The sealant also may be radially accommodated in the connecting piece 37 disposed on the controller housing. This arrangement is shown, in enlarged scale, in FIG. 12, wherein the sealant is designated by reference numeral 36.

Figure 13:
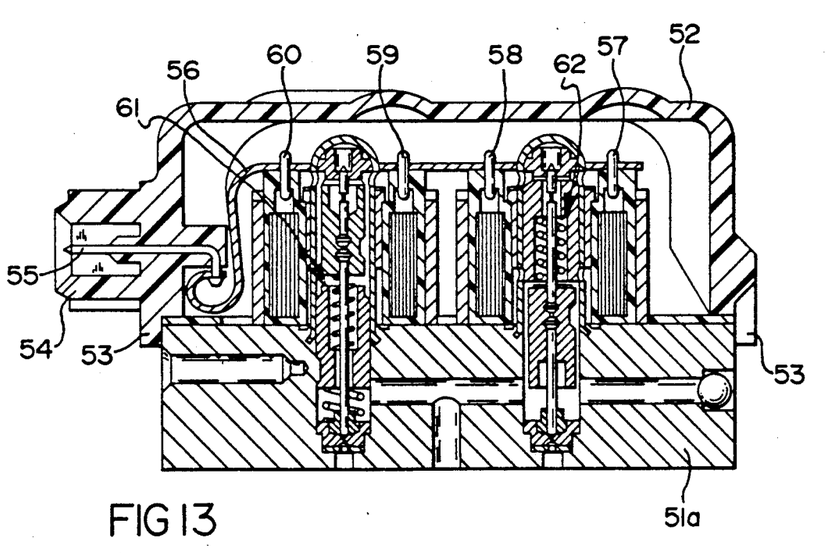
FIG. 13 shows a sectional view of a valve block.

FIG. 13 shows a valve block assembly which, in the practice of the invention, is combined with the electronic controller to form an integral assembly. The valve block assembly according to FIG. 13 comprises a valve-accommodating member 51a and a lid 52. Located on the lid 52 is a circumferential edge 53 and a lid step 54 provided with a contact blade 55. Numeral 56 designates a connecting foil interconnecting the contact pins 57, 58, 59 and 60 and the contact blade. The connecting foil contains corresponding electrical lines. Numeral 61 designates an electromagnetic valve which is open in its de-energized state. Numeral 62 designates an electromagnetic valve closed in its de-energized condition.

Figure 14:
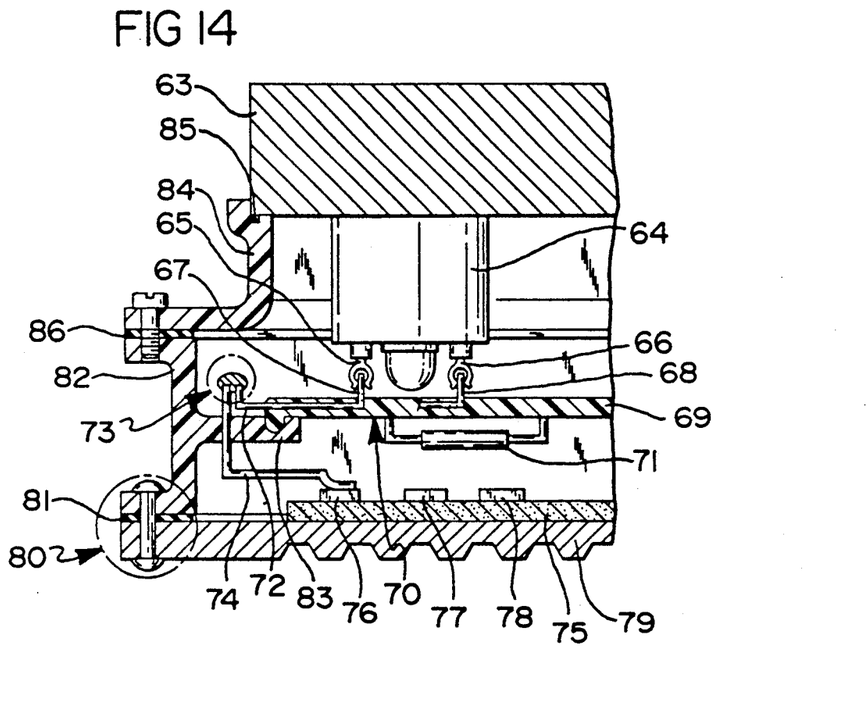
FIGS. 14 and 15 are a sectional view of the part of a the valve block.

In FIG. 14, the valve-accommodating body is designated by numeral 63. The portion of the coil protruding beyond the valve-accommodating body is designated by numeral 64. Provided on the front face of the coil are two spring contact elements 65, 66 which together with the contact pins 67, 68 establish clamp contacts. Disposed below the clamp contact is a plate-shaped carrier element 69 accommodating, in the interior and on the surface 70 thereof, conductors and electrical components. By way of example, one major electronic component 71 is shown. The plate-shaped carrier element may be a punched grid the conductors and the electronic components of which are spray-coated with plastic material. An electrical line is guided out of the carrier element 69 and is designated by numeral 72. In the area 73, it is soldered to another conductor 74 leading to a ceramic plate 75. The plate is a carrier element for electronic components and conductors. By way of an example, components 76, 77, 78 are shown therein. The conductor 74 is bonded to the electronic component 76. The ceramic plate 75 is fixed to an aluminum plate 79. The aluminum plate and the circuit preferably of the hybrid type which is associated with the ceramic plate 75, can be assembled and dissembled as an integral unit. The aluminum plate, in the area 80, is riveted or cemented and provided with a sealant 81. Numeral 82 refers to a circumferential, frame-type body of plastic material. It exhibits an inwardly directed stem 83. Fixed to the stem is the afore-described carrier plate 69. The plastic frame 82, through a circumferential, frame-shaped adapter portion 84, is fixed to the valve-accommodating body 63. Provided between the valve-accommodating body and the adapter means is the sealant 85. A sealant is provided between the adapter means 84 and the circumferential plastic frame 82. The sealant is designated by reference numeral 86.

Figure 15:
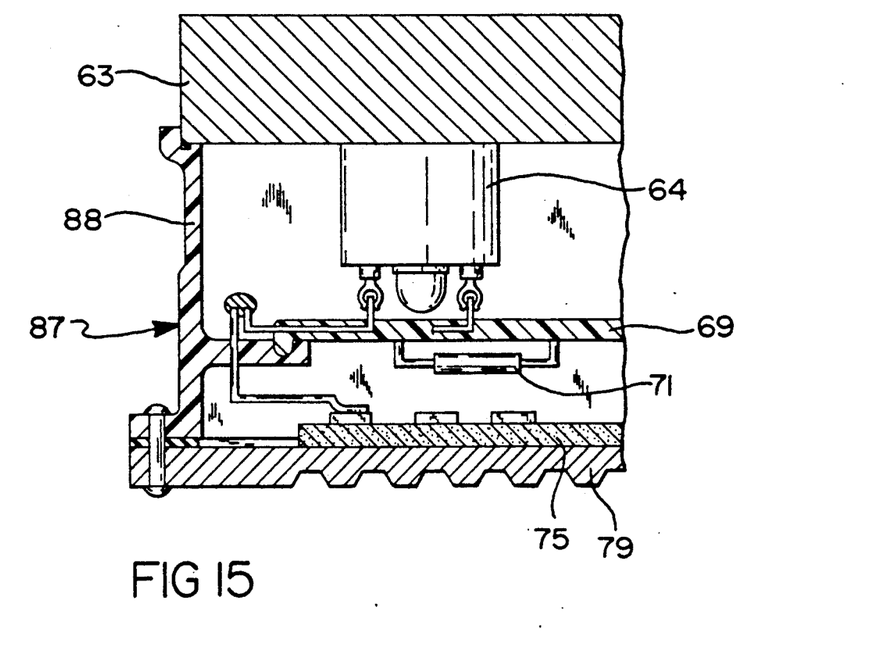

FIG. 15 shows a further development of the embodiment according to FIG. 14. In FIG. 15 adapter 84 of FIG. 14 is replaced by an annular frame element 87 the lateral wall of which is drawn up to the valve-accommodating body 63. The drawn-up portion of the wall is designated by numeral 88.

A plurality of embodiments have been described in the foregoing detailed description. Nevertheless, the invention is not limited to these examples. With the principle of the invention, the integration of electronic components with mechanical or hydraulic units is generally anticipated without departing from the scope and spirit of the invention.

What is claimed is:

1. An electrohydraulic pressure control means for a brake pressure control means in a slip control system, comprising at least one electromagnetically actuatable hydraulic valve disposed in block-type manner within a valve-accommodating member, including coils protruding beyond the valve-accommodating member, with the coils, at the portions protruding beyond the valve-accommodating member, being furnished with contact elements, further comprising a lid covering the protruding coil portions and the contact elements, comprising a carrier element for a conductor which is disposed within said lid, and comprising an electronic control means, wherein at least a portion of the lid is arranged as at least a part of an electronic controller, and wherein in the area of the valve-accommodating member (18) a mechanical mounting, positioning and anchoring means (3) is provided which is loadable by tensile stresses and interconnects the electronic controller (1) and the valve-accommodating member (18), and wherein an electrical contact means (4) is provided in the area of the lid (13) separated and spaced apart from said anchoring means (3) and connecting electrical conduits for applying electric power to the coils (5,6) to the electronic controller (1).

2. An electrohydraulic pressure control means according to claim 1, wherein a physical distance (17) permitting a heat dissipation between the electronic controller (1) and the valve-accommodating member (18) and the lid (13).

3. An electrohydraulic pressure control means according to claim 2, wherein provided on lid (13) is a nozzle (14) for accommodating the electrical contact means (4) in which is disposed a sealant (15) for accommodating a contact element (16) of the controller (1).

4. An electrohydraulic pressure control means according to claim 1, wherein the controller, in the area of the electrical contact means (4), is detachably secured to the lid (13) by means of a resilient element (22).

5. An electrohydraulic pressure control means according to claim 1 wherein the carrier element (11) for a conductor plate, is disposed in a manner pluggable on the contact elements (7, 8, 9, 10) of the coils, on contact pins of the coils (5, 6) and on the contact element (16) of the controller (1) protruding through the lid (13).

6. An electrohydraulic pressure control means according to claim 1 wherein the electrical contact means (4) is arranged as a guiding, fixing and tolerance balancing element and is provided with a resilient guiding, fixing, tolerance balancing and sealing body (15).

7. An electrohydraulic pressure control means according to claim 1 wherein an electrical clamping connection is provided comprising a spring contact element (32) located on the conductor carrier, and a contact pin (31) located on the controller.

8. An electrohydraulic pressure control means according to claim 7 wherein disposed on the conductor carrier (11) is a metal grid embodying the conductor tracks and being coated with a plastic material.

9. An electrohydraulic pressure control means according to claim 8, wherein the lid comprises a frame (38) and a plate (39) detachably secured by snap means to the frame.

10. An electrohydraulic pressure control means according to claim 1, wherein the electrical contact means (4) comprises a plug connection (41, 42) removable from an interior chamber disposed underneath the lid.

11. An electrohydraulic pressure control means according to claim 10, wherein the electrical contact means (4) comprises a clamp means (44) fixed to the controller and, in the assembly of the controller, establishing a clamping connection into the conductor carrier (45).

12. An electrohydraulic pressure control means according to claim 11, wherein a mounting platform (47) for the lid (13) in flat abutment with the valve-accommodating body (18) is provided.

13. An electrohydraulic pressure control means according to claim 12 wherein at least one valve sleeve of dome-shape configuration (46) is arranged as a centering means for the assembly of the conductor carrier (45).

14. An electrohydraulic pressure control means according to claim 1 wherein at least a portion (69, 79) of the lid is arranged as an electronic controller with at least one carrier element (69) for the conductors and electronic components being disposed adjacent to front faces of the coils (64).

15. An electrohydraulic pressure control means according to claim 14, wherein at least one wall (69, 79) of an electronic controller is arranged as a lid of the valve block assembly.

16. A valve block assembly according to claim 15, wherein at least one wall (69, 79) of an electronic controller is arranged as a lid of the valve block assembly and as a carrier element for the conductors and electronic components (71, 76, 77, 78).

17. A valve block assembly according to claim 16, wherein the lid comprises at least one frame element (82) on which is located at least one carrier element (69) for the conductors (72) and the electronic components (71).

18. A valve block assembly according to claim 17, wherein provided between the frame element and the valve-accommodating element is an adapter (84) of a frame type configuration.

19. A valve block assembly according to claim 18, wherein provided on the frame-type body (82) is an external plate (79) of aluminum and arranged as substrate for a carrier plate (75) for conductors and electronic components (76, 77, 78) with the carrier plate (75) being made of ceramics, wherein an internal plate (69) is provided which is arranged as a carrier element and receives, in the surface (70) thereof, conductors and electronic components (71).

20. A valve block assembly according to claim 19, wherein the frame-shaped body (87, 88) is of a height protruding beyond the parts (64) of the coils, projecting beyond the valve-accommodating body (63).

* * * * *